Feb. 6, 1951

W. G. AMESZ 2,540,313

APPARATUS TO CONTROL THE GAIN OF SIGNAL AMPLIFYING SYSTEMS

Filed July 20, 1946

2 Sheets-Sheet 1

INVENTOR
WILHELM GODFRIED AMESZ
BY [signature]
AGENT

Feb. 6, 1951

W. G. AMESZ
APPARATUS TO CONTROL THE GAIN OF
SIGNAL AMPLIFYING SYSTEMS 2,540,313

Filed July 20, 1946

2 Sheets-Sheet 2

INVENTOR
WILHELM GODFRIED AMESZ
BY
AGENT

Patented Feb. 6, 1951 2,540,313

UNITED STATES PATENT OFFICE 2,540,313

APPARATUS TO CONTROL THE GAIN OF A SIGNAL AMPLIFYING SYSTEM

Wilhelm Godfried Amesz, Eindhoven, Netherlands, assignor to Hartford National Bank and Trust Company, Hartford, Conn., as trustee Application July 20, 1946, Serial No. 685,144
In the Netherlands June 1, 1945

Section 1, Public Law 690, August 8, 1946
Patent expires June 1, 1965

5 Claims. (Cl. 179—171)

The present invention relates to apparatus for controlling the gain of a signal amplifying system.

It is known to use rectifying circuit-arrangements having a threshold sensitiveness to derive a control voltage from a signal, the amplitude of which is subject to variations, in such a manner that the control voltage starts as soon as the signal amplitude exceeds a definite value prescribed by the threshold sensitiveness. Such a rectifying circuit-arrangement may, for example, consist of a diode in series with a source of bias which supplies a fixed negative bias to the diode-anode, so that this direct voltage acts as a threshold voltage, a condenser, being connected in parallel with this series arrangement. If a signal is supplied to this circuit-arrangement and the amplitude of the signal increases beyond the value of the fixed bias during the positive half period, the rectifier allows current to pass; during the negative half period of the signal the rectifier does not transmit current. In this circuit-arrangement the control condenser is charged to a direct voltage which is determined by the difference between the signal amplitude and the threshold voltage. The direct voltage can be used as a control voltage.

This circuit-arrangement has the drawback that it has a comparatively low control sensitiveness, which can only be raised by increasing the signal voltage; at the same time, however, the threshold voltage, i. e. the fixed bias voltage must be raised. In a practical embodiment of this circuit-arrangement the cathode of the rectifier has, moreover, a high potential with respect to earth, which may entail difficulties.

Accordingly, the primary object of this invention is to provide an amplifier having improved control means. More particularly, the object of the invention is to provide a highly sensitive means for controlling the gain of an amplifier when the amplitude of input signal exceeds a predetermined peak value.

The disadvantage of a high threshold voltage is avoided by substituting for the diode a tube having at least one grid and by setting up the threshold voltage in the grid circuit. In this case the threshold voltage can be $g$ times lower, $g$ being the amplification factor of the tube.

However, this circuit-arrangement has not yet a satisfactory control sensitiveness. In order to increase this control sensitiveness the signal according to the invention is supplied in phase to the anode and grid circuit of the discharge tube.

The negative bias serving as a threshold voltage is chosen so as to be such that at a definite, maximum permissible value of the signal, anode current just fails to flow through the tube. If, for example, the control voltage is used for the automatic control of the amplification of a low-frequency amplifier the said maximum permissible value of the signal is, for instance, determined by the signal voltage, at which the distortion occurring in the amplifier is just permissible. Now, if the signal exceeds, during part of the positive half period, the limit as determined, anode current begins to flow, and at the same time the anode voltage, which is in phase with the grid voltage, increases, so that the anode current is raised further.

The circuit-arrangement according to the invention can advantageously be used for the control of the amplification of low-frequency amplifiers. In this case the signal voltages, which are supplied to the grid and anode circuit of the rectifying tube respectively, is taken from the output circuit of an amplifying tube, whereas the control voltage produced by the rectifying circuit-arrangement is, for example, supplied to the input circuit of this amplifying tube.

If the amplifier comprises two push-pull connected amplifying tubes the signal voltage supplied to the grid circuit of the rectifying tube, can be taken from the input circuit of one tube, the signal voltage supplied to the anode circuit of the rectifying tube being taken from the output circuit of the other tube of the push-pull circuit. The two voltages then have again the same phase, whilst they are also suitable to a greater or less degree as regards their order of magnitude. Such a circuit-arrangement has particular advantages if negative feedback is used in the push-pull connected amplifying tubes. Owing to the use of a push-pull arrangement the non-linear distortion occurring in the amplifier will primarily be brought out by the occurrence of the third harmonic of the signal to be amplified. The signal amplified in the output circuit is now supplied in phase-opposition to the input circuit of the push-pull connection. Upon variation of the input signal the peak value of the total input voltage will consequently be subject to a greater variation than if no negative feedback were used. As this total input voltage, or a proportional part thereof, is supplied, as a signal voltage to the grid circuit of the rectifying tube, the signal voltage in the grid-circuit of the rectifying tube will increase more rapidly than if no negative feedback is used, so that a greater control sensitiveness is obtained.

In order that the invention may be clearly understood and readily carried into effect, it will now be explained more fully with reference to the accompanying drawing, given by way of example.

Figures 1, 2:
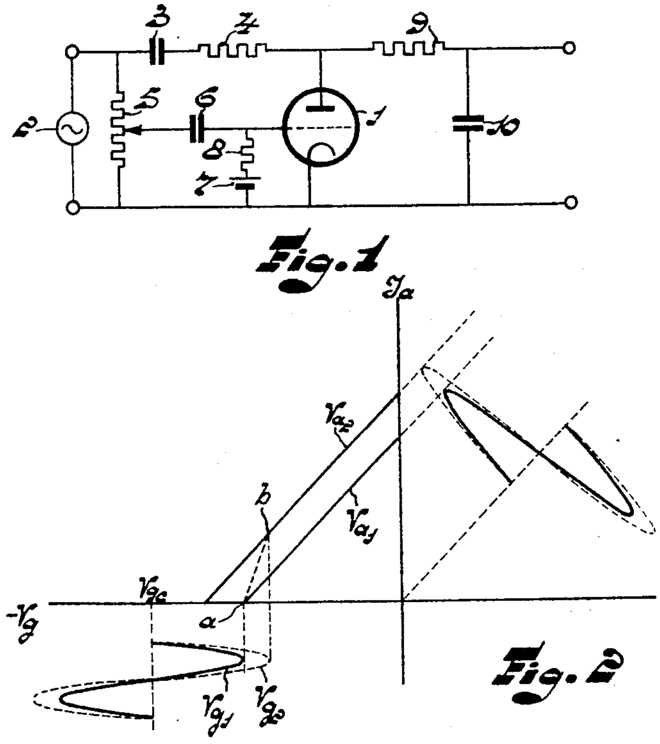
Fig. 1 represents a rectifying circuit-arrangement according to the invention, Fig. 2 illustrating the operation of the circuit-arrangement with reference to the anode-current-grid voltage characteristic curve.

The circuit-arrangement shown in Fig. 1 comprises a rectifying tube 1, to the anode of which an alternating voltage, originating from a signal source 2, is supplied through a condenser 3 and a resistance 4. An alternating voltage likewise originating from the source 2, is supplied to the grid through a potentiometer 5 and a condenser 6, this grid having also fed to it a threshold voltage which is supplied by a source of direct voltage 7 through a resistance 8. The anode circuit includes a resistance 9 and a variable condenser 10 through which a rectified voltage, the control voltage, is set up.

Fig. 2 shows two *Ia*—*Vg* characteristic curves (*Ia*=anode current, *Vg*=grid voltage) of the tube 1; for the sake of simplicity they are represented by straight lines. The signal source 2 (in Fig. 1) supplies to the tube a grid- and an anode voltage which are in phase. With a maximum permissible signal the negative direct grid voltage of the tube $Vgc$ of the tube is adjusted, with the aid of the source of direct voltage 7, in such a manner that at the peak value of the alternating grid voltage $Vg^1$ and the alternating anode voltage $Va^1$ anode current just fails to flow. When the peak values prevail the working point of the tube is at *a*. If the signal exceeds the permissible maximum and if, consequently, the alternating grid voltage rises from $Vg^1$ to $Vg^2$ and the alternating anode voltage changes from $Va^1$ into $Va^2$, anode current begins to flow. At the moment when the new peak values appear the working point is located on the highest characteristic curve at point *b*. Consequently, during the rectifying effect of the rectifying tube the working point follows the line *a*—*b*. The control sensitiveness of the circuit-arrangement depends upon the slope of this line and it is evident that this slope is steeper than that of the *Ia*—*Vg* characteristic curve itself, which would be determinative if the signal voltage were supplied solely to the grid circuit or solely to the anode circuit.

Figure 3:
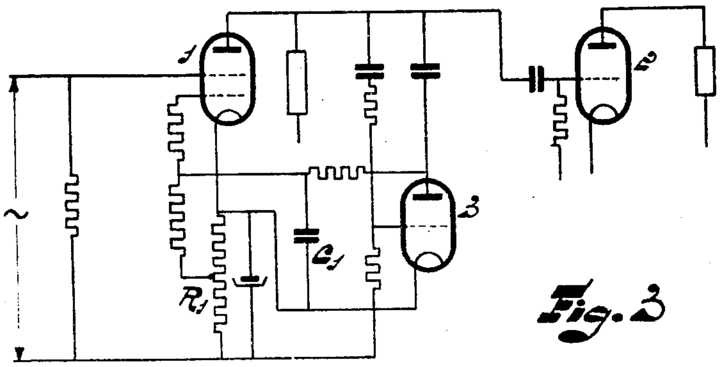
Figs. 3 and 4 show schematically two preferred embodiments of the circuit-arrangement according to the invention.

Fig. 3 illustrates the use of the circuit-arrangement according to the invention in a low-frequency amplifier. The signal to be amplified is supplied to an amplifying tube 1, next to which one or more other amplifying tubes, such as the tube 2, are connected. From the output circuit of the tube two voltages having the same phase are taken, one of which is supplied to the anode and the other to the grid of the rectifying tube 3. The negative direct grid voltage, which acts as a threshold voltage for this tube, is obtained from the cathode resistance $R_1$ of the tube 1. As soon as the control tube 3 becomes operative, when the signal voltage supplied to the amplifier exceeds the maximum permissible value, anode current begins to flow through the rectifying tube and the control condenser $C_1$ is charged. The negative voltage of this condenser is supplied to the control grid $g_1$ of the tube 1 due to which the amplification of this tube is reduced.

Figure 4:
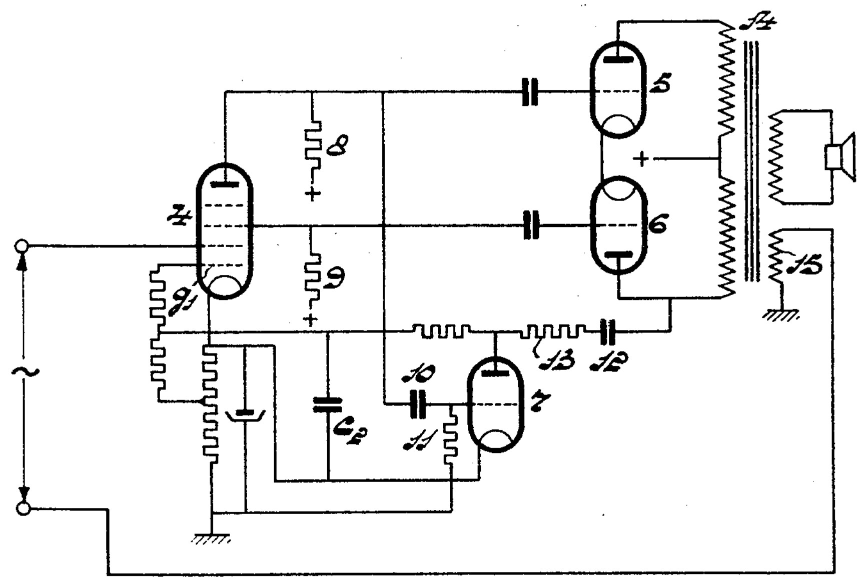
Figure 5:
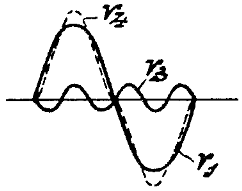
Fig. 5 is a voltage curve illustrative of the operation of the circuit in Fig. 4.

In the amplifying circuit-arrangement shown in Fig. 4 there is connected next to the tube 4, to the second grid $g_2$ of which the signal is supplied, a push-pull connection of two tubes 5 and 6. The control voltages for the tubes 5 and 6 are taken from resistances 8 and 9 included in the anode and screen-grid circuits respectively of the tube 4. The voltages across these resistances are in phase-opposition, so that the tubes 5 and 6 are controlled in phase-opposition, as is customary in push-pull amplifiers. The alternating grid voltage for the rectifying tube 7 is taken, through a condenser 12 and a resistance 11 from the input circuit of tube 5, whereas the alternating anode voltage for the rectifying tube 7 is obtained through a condenser 12 and a resistance 13 from the anode circuit of the tube 6, so that the two voltages are in phase. The control voltage is obtained again from a control condenser $C_2$ and supplied to a control grid $g_1$ of the tube 4. The output transformer 14 of the push-pull amplifier is provided with a third winding 15, through which a negative feedback voltage is produced which is supplied in series with the signal to be amplified to the input circuit of the tube 4. As has been said above, the control sensitiveness of the rectifying circuit-arrangement comprising the tube 7 is raised by the use of the negative feedback, which may be explained as follows. For the same power delivered by the amplifier the control voltages having the fundamental frequency, which act between the control grids and the cathode of the tubes 5 and 6, must be the same with or without negative feedback. In Fig. 5 the control voltage having the fundamental frequency and acting between grid and cathode of the tube 5 is represented by the curve $V_1$. If a negative feedback is provided, another voltage $V_3$ with the third harmonic of the fundamental frequency represented by the curve $V_3$ in Fig. 5 will however be operative besides the voltage $V_1$. In this case it is assumed that, as is known from experience, the distortion brought about in the push-pull amplification stage of the amplifier primarily consists of the third harmonic of the fundamental frequencies.

The sum of the voltages $V_1$ and $V_3$ is represented in Fig. 5 by the curve $V_4$, from which it appears that the peak voltage exceeds the voltage $V_1$. Consequently, if the voltage V instead of the voltage $V_1$ is supplied to the grid circuit of the rectifying tube 7, the control sensitiveness will increase, because the peak voltage on which the value of the generated control voltage also depends, is larger in this case.

What I claim is:

1. In combination with an amplifying system responsive to an input signal provided with an electron discharge tube having a control electrode, apparatus for controlling the gain of said system when the amplitude of the input signal exceeds a predetermined peak value, said apparatus comprising an electron discharge device provided with a cathode, a grid and an anode, means to derive from said system first and second cophasal signals proportional to said input signal, means to supply said first signal to said anode, means to supply said second signal to said grid, a filter capacitance connected between said cathode and anode, and means to impress a fixed bias voltage on said grid having a magnitude at which said device is rendered operative to effect anode current flow only when the amplitude of the input signal exceeds said peak value, whereby a control voltage is developed across said capacitance, and means to apply the control voltage across said capacitance to said control electrode of said amplifying tube to control the gain thereof.

2. In combination with a signal amplifying system including an electron discharge tube provided with a cathode, first and second control grids and an anode, a cathode bias resistance, means to apply the input signal between said second control grid and said cathode through said cathode resistance, and a grid resistance connected between said first control grid and a point on said cathode resistance, rectifying apparatus for producing a control voltage for said amplifying system when said input signal exceeds a predetermined peak value, said apparatus comprising an electron discharge device having a cathode, a grid and an anode, capacitive means coupling the anode of said tube to the anode of said device, capacitive means coupling the anode of said tube to the grid of said device, a filter capacitance connected between the anode and cathode of said device, means connecting the anode of said device to a tap in said grid resistance, and means connecting the cathode and the grid of said device across a portion of said cathode bias resistance to impress a fixed bias voltage on the grid of said device having a magnitude at which said device is rendered operative to effect anode current flow therein when the amplitude of the input signal exceeds said peak value, whereby a control voltage is developed across said filter capacitance which is applied to the first control grid of said tube.

3. In combination with a signal amplifying system including a driver stage provided with a first electron discharge tube having a cathode and two control electrodes, the input signal being applied to one of said control electrodes, and an output stage provided with second and third electron discharge tubes arranged in push-pull relation, each of said second and third tubes having a grid and a plate, rectifying apparatus adapted to produce a control voltage for said amplifying system when said input signal exceeds a predetermined peak value, said apparatus comprising an electron discharge device having a cathode, a grid and an anode, capacitive means coupling the grid of said second tube with the grid of said device, capacitive means coupling the plate of said third tube with anode of said device, a filter capacitance connected between the cathode and anode of said device, means to impress a fixed bias voltage on the grid of said device having a magnitude at which said device is rendered operative to effect anode current flow therein when the amplitude of input signal exceeds said peak value, whereby a control voltage is developed across said filter capacitance, and means to apply said control voltage to the other control electrode of said first tube.

4. An arrangement as set forth in claim 3, wherein said amplifying system further includes means to derive a negative feedback voltage from said output stage, and means to apply said negative feedback voltage to said one of said control electrodes of said first tube in series with said input signal.

5. An arrangement as set forth in claim 3, wherein said driver stage includes a cathode bias resistor in connection with the cathode of said first tube, and said fixed bias voltage for the grid of said device is derived from said cathode resistor.

WILHELM GODFRIED AMESZ.

REFERENCES CITED

The following references are of record in the file of this patent:

UNITED STATES PATENTS

| Number | Name | Date |
|---|---|---|
| 1,745,841 | Bradbury | Feb. 4, 1930 |
| 1,971,646 | Farnham | Aug. 28, 1934 |
| 2,006,052 | Kreuzer | June 25, 1935 |
| 2,095,406 | Barber | Oct. 12, 1937 |
| 2,158,248 | Numans | May 16, 1939 |
| 2,207,906 | Weagant | July 16, 1940 |
| 2,331,360 | Tuckerman | Oct. 12, 1943 |